Figure 1:
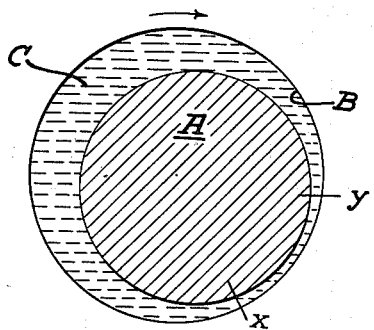

Feb. 24, 1942.     T. P. REMY     2,274,617
LUBRICATING OIL COMPOSITION
Filed April 27, 1938

INVENTOR.
THERON P. REMY
BY Henry Gifford Hardy
ATTORNEY.

Patented Feb. 24, 1942

2,274,617

UNITED STATES PATENT OFFICE 2,274,617

LUBRICATING OIL COMPOSITION

Theron P. Remy, Los Angeles, Calif.

Application April 27, 1938, Serial No. 204,573

5 Claims. (Cl. 252—52)

The present invention relates to improvements in lubricating oil composition and more particularly to improvements in compounded petroleum lubricating oils.

The trend of development in fine machine work, particularly that relating to internal combustion engines, is toward closer clearances and other mechanical facts which make increasing demands on oil used for lubrication. These demands are primarily directed to the abilities in a lubricant of withstanding higher operating temperatures and increased load pressures. The use factors of a lubricant are dependent upon thermal stability, i. e. a physical capacity to continue functioning over a period of hours at relatively high temperatures and high pressures. Thermal stability is determined by the extent of oxidation or decomposition and the resultant production of such reaction with respect to the amount and location of its production within the engine.

The exact qualities of that which improves lubrication are far from being precisely understood. The subject seems to center particularly on molecular physics and complex chemistry. It has been found that certain bodies which have been designated as protoparaffins can be removed chemically from the lubricating oils with acetone while on the physical side it has been demonstrated that lubricity in a motor oil can be destroyed through the mere expedient of passing oil over heated glass beads. As a correlary of the destruction of the physical property it has also been found that lubricity is again built up within the oil by allowing it to stand for a number of hours—apparently due to a delicate oxidation reaction. Lubricity in motor oil has also been removed through absorption, for example, on finely divided Woods metal. Here again the phenomena of lubricity is restored in several days by permitting it to stand.

A lubricant has a triumvirate of fundamental functions. One is to reduce friction between rubbing surfaces. Another is to provide compression through partial sealing rings or moving parts in a compression zone. And the third is to assist in heat dissipation through transfer. In the reduction of friction oil lubricates by means of a thick film acting as a cushion which, in rotating members, is actually pumped around a large part of bearing surfaces due to the physics of the motion in the rotating parts and so tends to act as a rotary pump. Also, oil acts through boundary line lubrication which occurs at points and times where bearing pressures completely overcome the resistances of the thick film lubrication and approach metal to metal contact. This boundary line lubrication is entirely due to adsorbed and polar molecules.

The relation of viscosity or thickness of an oil to lubrication is desirable in a ratio preventing actual metal to metal contact at the bearing surfaces only during standing and in the early stages of movement at which places and times extreme pressures are built up to such an extent as to rupture or destroy the adsorbed and polar film of the ordinary lubricant.

In what is termed thick film lubrication, internal friction within the oil film in the average motor car engine reduces the efficiency some 8%. This internal friction is commonly called oil drag. Oil drag has been tolerated because efficient means of overcoming it and building up an adsorbed and polar film for boundary lubrication at the same time, have presented marked difficulties up until the present disclosure.

With any given oil used in a rotating bearing the clearance and the point of closest approach becomes smaller with heavier loading or increased speed. When these factors reach a certain point, the lubricating film becomes too thin to keep the surfaces apart and a change in the type of lubrication occurs. The change is believed to proceed from full fluid lubrication through a semi-fluid lubrication and into boundary lubrication which is the lubrication resulting from the adsorbed and polar film. In boundary lubrication the function of physics in the oil disappears and friction is reduced through what is termed as "oiliness."

In Figure 1 there is shown in diagrammatic form a sectional view exaggerated to show the normal forces at work. A represents a rotating member. B is the inner surface of the bearing. C represents the lubricating oil. The longer distance between $x$ and $y$ represents the area of full fluid lubrication. There is a tendency for the oil to be pumped around by the rotation of the member A. The shorter distance from $x$ to $y$ is the sector of greatest pressure and the major point of boundary lubrication.

The present invention is concerned primarily with what is broadly termed "oiliness" for it is at this point where the difference between success or breakdown is so drastically found.

"Oiliness" is a term of relative quality which has the attribute of reduction of friction in lubrication through consideration of molecular physics and oxidation chemistry. "Oiliness" is that property of any liquid to form a powerful antifriction layer between two solids and is a function of the relationship existing between solid and liquid inter-faces. It is further a polar saturating liquid which reduces the attractions of metals for each other.

"Oiliness" is not immediately transmitted to bearing surfaces but is gradually adsorbed to the surfaces to reduce the static coefficient of friction.

It is among the objects of the present invention therefore to provide greater oiliness manifested as lowered frictional resistance both within the molecular structure of the lubricating oil itself and between bearing surfaces lubricated by the oil; to increase film strength which enables the lubricating oil to sustain high loads under friction and to produce a superior action in the reduction of sludging and the elimination of sludge products.

It has been known that lubrication could be enhanced by consideration of the following observations: In the first instance, the more asphalt left in after a complete refining process results in a corresponding increase in the coefficient of friction. Also, naphthene hydrocarbons of the saturated cyclic type which occur in large quantities in Western motor oils are eminently valuable. A third consideration is the blending of motor oils from older geologic stocks, as for example, Pennsylvania stocks with those of newer geologic formations as Western stocks which are more susceptible of mild oxidation processes and give better lubrication.

In the accomplishment of objects hereinbefore mentioned, among the others which are inherently within the disclosure of the present invention, there is compounded with a petroleum lubricating oil a minor portion of a free unsaturated monohydroxy alcohol of the secondary type, or a mixture of such alcohols, in an amount insufficient to materially alter the normal liquid character of the petroleum lubricating oil itself. The amount for accomplishing satisfactory results is from .005 to 3%.

The improved lubricating oil compositions of the present invention have in addition to the lubricating properties of a petroleum oil of which they have compounded, a retarding action on the oxidation products formed in the lubricating oil during use which are of the character of objectionable sludge. Deposits of sludge and carbon which may form in the engine during combustion are soft and friable rather than hard and coherent masses usually formed due to polymerization products aiding in the formation of hard resinous masses. This characteristic brings about an important result in that engines using the oil of the present invention become self-cleaning. In the Diesel type of engines, for example, the high temperatures to which the lubricating oil are subjected frequently cause deposition of sludge and carbonization in the piston ring grooves as well as behind the piston rings. This results in the sticking of the rings which not only deprives the piston and the cylinder walls of proper lubrication causing excessive wear but oftentimes results in the scoring of the cylinder walls. Depending upon the type of oil used, the carbon deposits and the polymerization product formed in sludging, hard and coherent enough to cause the above mentioned conditions, is eliminated to a substantial degree by the practice of the invention herein.

The unsaturated monohydroxy alcohols of the secondary type used and compounded with the lubricating oils are specifically sterols, both zoosterols and phytosterols, having molecular weights ranging from 368 to 390. The principal sterol of this group is cholesterol having a formula $C_{27}H_{45}OH$. Cholesterol is a cyclic secondary alcohol containing a double bond. It is usually considered to contain four rings and is convertible into the saturated product cholestan. Cholesterol having a molecular weight of 386, a melting point of 148.5° C. and distilling at 360° C., is non-saponifiable and withstands successfully the heat pressure imposed upon lubricating oils. Results obtained in practical application with cholesterol seem to make this the preferable substance. It appears that numerous isomers of cholesterol generally are useful for the purposes herein disclosed.

Other sterols, for example, phytosterol and the phytosterol group likewise have the property of bringing about the desired results when used in the petroleum lubricating oil as disclosed herein, such as sitosterol, stigmasterol, brassicasterol and ergosterol. The sterols are commonly found in vegetable and animal fats. Inasmuch as there are several methods of synthesising cholesterol and certain sterols, it is to be understood that the invention includes the use of either natural or synthetic sterols and cholesterol and in varying degrees of purity so long as sufficient of the sterol is present and any other materials with it are not objectionable.

In testing the high molecular weight unsaturated monohydroxy alcohols of the secondary type in small percentages with lubricating oils as disclosed herein, the desired reactions in boundary lubrications brought about may be readily demonstrated.

Figure 2:
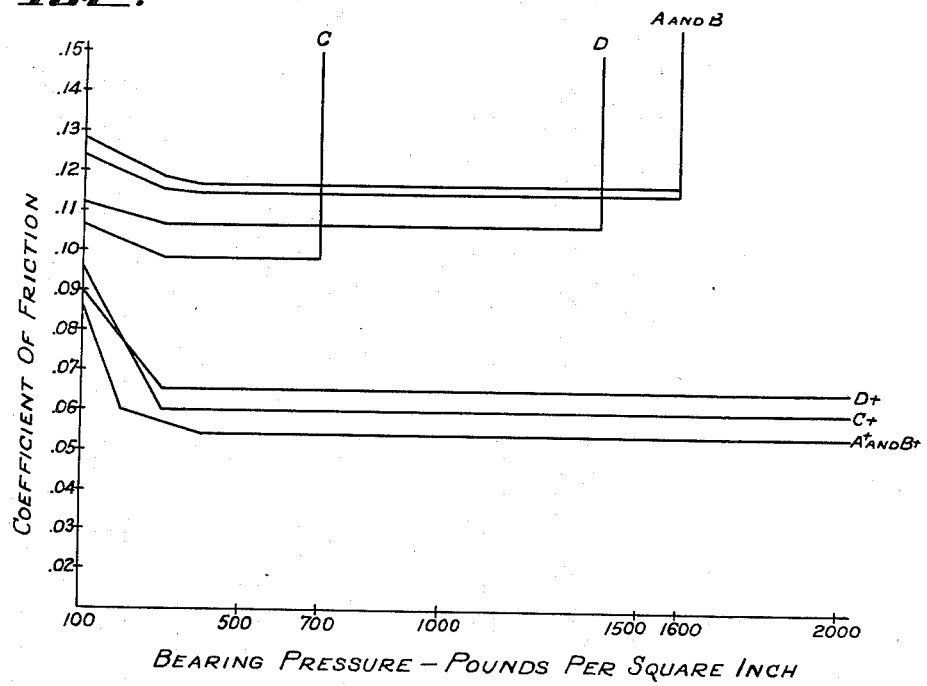
Figure 3:
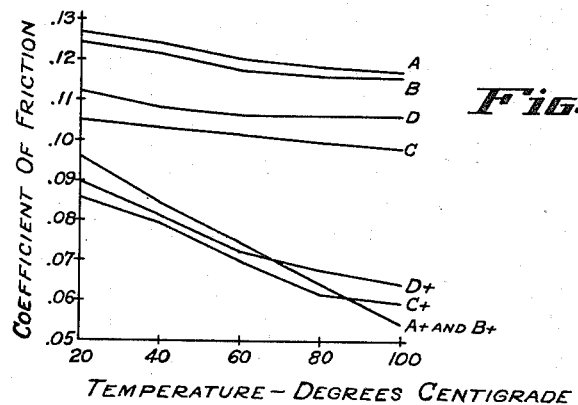

Regardless of the type of oil used, the adsorbed film is improved when tested both on the standard type testing machine and on heating various types of bearings and bearing surfaces for a number of hours. On the standard type testing machine using a ¾" steel roller bearing, oils breaking down and resulting in bearing seizure from 1700 lbs. to 1600 lbs. per square inch have withstood pressures above 2400 lbs. per square inch without break down with the addition of from .005 to 3% of one of the additives here disclosed. Likewise, on the heating tests, no corrosion resulted from any type of oil impregnated with the additive which is an important and extensive commercial factor. The results of specific tests exemplifying the foregoing are expressed in the accompanying drawing in which Fig. 2 represents the bearing pressure breakdown test and Fig. 3, the temperature test. Four samples of oils are indicated in which oil A is a Pennsylvania blended oil, oil B likewise a Pennsylvania blended oil, oil C a naphthene base blend and oil D a mid-continent oil with paraffin base. In each instance and for both tests, .05% of cholesterol was added with the result that in Fig. 2 none of the samples showed any breakdown on pressures above 2400 lbs. per square inch, and the coefficient of friction was materially reduced with the increase of temperature as shown in Fig. 3. A more detailed analysis of the oils used is as follows:

|  | Oil | | | |
| --- | --- | --- | --- | --- |
|  | A | B | C | D |
| Type | Penn | Penn | Naphthene | MC |
| Gravity | 29 | 30 | 20 | 26 |
| Vis. (Saybolt Universal @ 210° F.) | 55 | 54 | 48 | 52 |
| Viscosity index | 109 | 97 | 42 | 80 |
| Neutralization | .04 | .03 | .08 | .03 |
| Carbon residue | .32 | .32 | .15 | .25 |

The present invention is not to be limited by any theory of methods for producing the added ingredients or any theory of their activity for the purposes here disclosed.

I claim:

1. A lubricant consisting of a liquid petroleum lubricant carrying about 3% of a sterol to increase oil film strength and to prevent sludging.

2. A lubricant consisting of a liquid petroleum lubricant carrying about 3% of a zoosterol to increase oil film strength and to prevent sludging.

3. A lubricant consisting of a liquid petroleum lubricant carrying about 3% of a phytosterol to increase oil film strength and to prevent sludging.

4. A lubricant consisting of a liquid petroleum lubricant carrying about 3% of a cholesterol to increase oil film strength and to prevent sludging.

5. A lubricant consisting of a liquid petroleum lubricant carrying about 3% of a cholestan to increase oil film strength and to prevent sludging.

THERON P. REMY.